United States Patent
Petrusson

[11] 3,891,930
[45] June 24, 1975

[54] METHOD AND DEVICE FOR DETERMINING THE EXISTENCE AND THE TIME POSITION OF MAIN PEAKS APPEARING IN AN ELECTRONIC SIGNAL

[75] Inventor: Erling Olav Valdemar Petrusson, Sollentuna, Sweden

[73] Assignee: AB Teleplan, Solna, Sweden

[22] Filed: Sept. 13, 1973

[21] Appl. No.: 396,724

[30] Foreign Application Priority Data
Sept. 15, 1972   Sweden............................ 11988/72

[52] U.S. Cl. ............ 328/117; 307/235 A; 328/147; 328/151
[51] Int. Cl. ....................... H03k 5/18; H03k 5/20
[58] Field of Search ............................ 328/115–117, 328/146–147, 150–151; 307/235 R, 235 A

[56] References Cited
UNITED STATES PATENTS
| | | | |
|---|---|---|---|
| 2,775,698 | 12/1956 | Bell et al. | 328/116 |
| 3,076,145 | 1/1963 | Copeland et al. | 328/117 X |
| 3,508,158 | 4/1970 | Marchese | 328/117 |
| 3,654,562 | 4/1972 | Reilly, Jr. et al. | 328/115 X |

*Primary Examiner*—John Zazworsky
*Attorney, Agent, or Firm*—Spencer & Kaye

[57] ABSTRACT

A method of examining an electrical signal to determine the time position of any main peaks in the signal comprises: dividing the signal into consecutive time intervals; allocating a variable reference level, called the cut-off level, to each of said time intervals, the value of said cut-off level being selected by analysing amplitude measurements made on the signal in a number of time intervals including the time interval to which the cut-off value is allocated; generating allocated cut-off levels during each consecutive time interval so as to provide a variable cut-off function; delaying the electrical signal under examination for the time required to generate the cut-off level function; comparing the amplitudes of the delayed signal and the cut-off level function to detect the presence of a main peak in the signal, and determining the time position of any main peak so detected.

7 Claims, 4 Drawing Figures

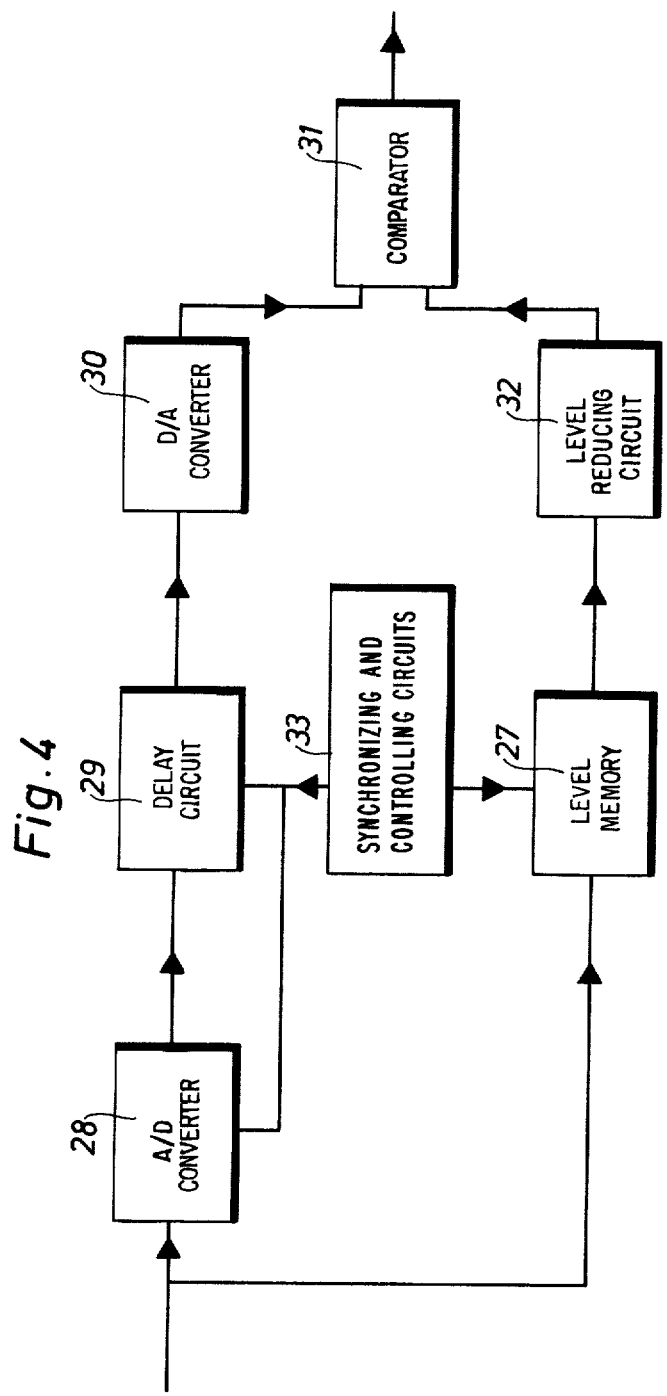

METHOD AND DEVICE FOR DETERMINING THE EXISTENCE AND THE TIME POSITION OF MAIN PEAKS APPEARING IN AN ELECTRONIC SIGNAL

BACKGROUND OF THE INVENTION

This invention relates to a method and apparatus for determining the existence and the time position of main peaks appearing in an electrical signal.

Previously, the existence and the time position of main peaks appearing in an electrical signal have been determined by continuously comparing the amplitude of the signal with a static reference level, called the cut-off level, which is constant for the duration of the signal. When this comparison reveals that the amplitude of the signal exceeds the cut-off level, a main peak is reckoned to be present. Using conventional methods it is then easy to determine the time position of the detected main peak by comparing the time position of the main peak with a reference time. However, there may be several main peaks having different amplitudes in one and the same signal and the problem is how to recognise these main peaks reliably. With the previously known method there is a great risk that main peaks having small amplitudes will be missed. However, if the cut-off level is lowered in an attempt to overcome this problem, unreliable information as to the existence of main peaks having larger amplitudes will be obtained because, having lowered the cut-off level, the comparison will result in side peaks, i.e. peaks present at the sides of a main peak, which per se are not main peaks being recorded as main peaks.

SUMMARY OF THE INVENTION

The present invention aims to provide a method and apparatus by which the above mentioned problems are obviated.

Accordingly, the present invention provides a method and apparatus for determining the existence and the time position of main peaks appearing in electronic signals by comparing the amplitude of said signals with a variable reference level, called cut-off level, in which: the signal to be examined is divided into consecutive time intervals, a cut-off level is allocated to each of said time intervals, the amplitude of said cut-off level being based upon an analysis of measurements performed on the amplitude of the signal in the corresponding interval and in a number of adjacent intervals; allocated cut-off levels are generated during each consecutive time interval thereby providing a variable cut-off level function for the electrical signal; said electrical signal is delayed for a time equal to the time required to generate said cut-off level function; the amplitude of the delayed signal is compared with the cut-off level function to detect the presence of a main peak in the signal; and the time position of any main peak so detected is determined.

BRIEF DESCRIPTION OF THE DRAWINGS

In order that the invention may be readily understood, an embodiment thereof will now be described in more detail, by way of example, with reference to the accompanying drawings, in which:

FIG. 4 is a block diagram showing one embodiment of apparatus in accordance with the present invention.

DESCRIPTION OF PREFERRED EMBODIMENTS

Figure 1:
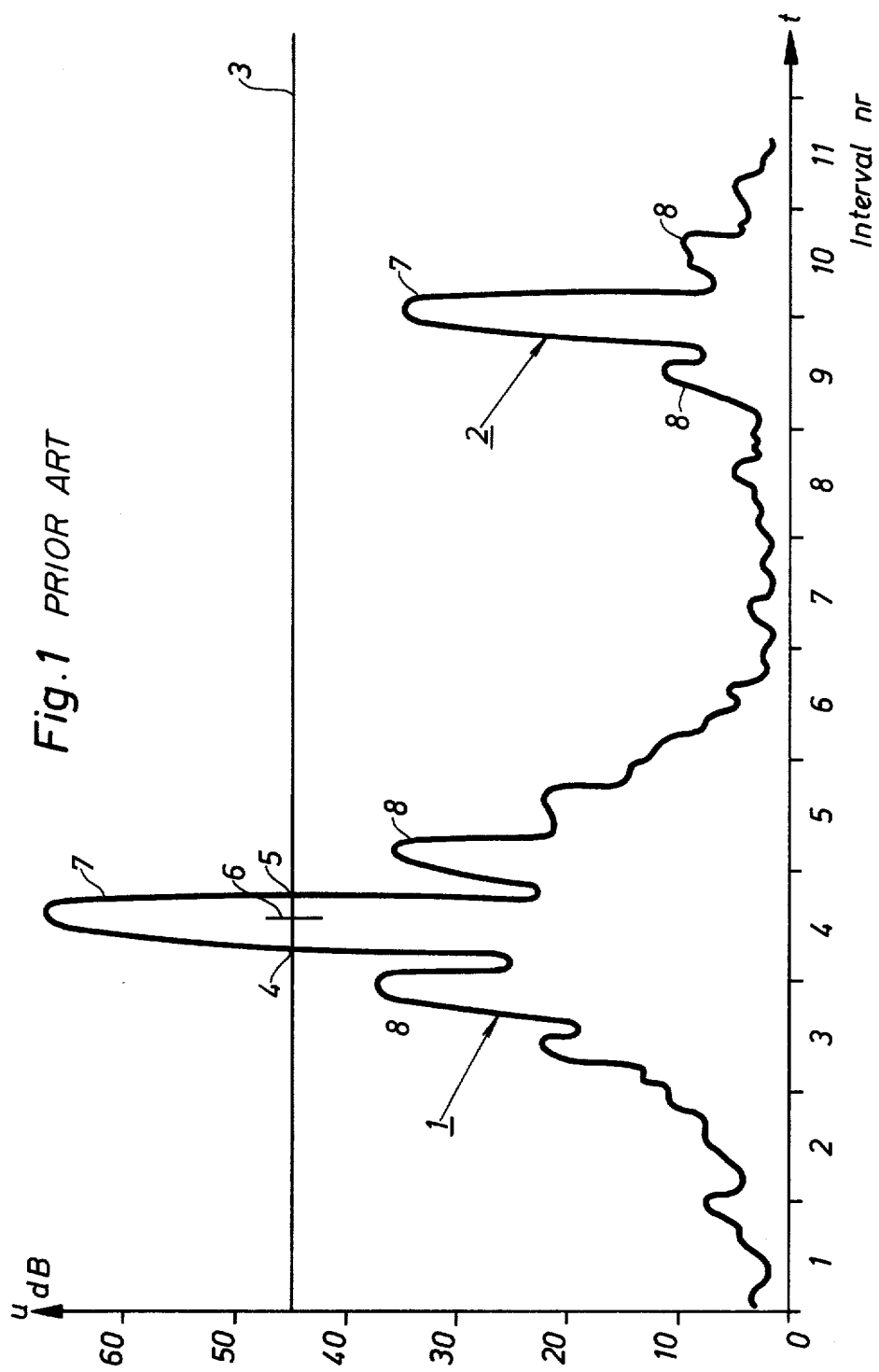
FIG. 1 is a diagram illustrating the performance of a known method for determining the time position of main peaks in a signal having the indicated general appearance.

The present invention may be employed to determine the existence and the time position of main peaks in an electrical signal having the general appearance as indicated in FIG. 1, and will yield a very exact and reliable result.

A signal of the kind indicated in FIG. 1 is for example obtained in taking bearings when a directional aerial is rotated and sweeps over a target or targets to be located. FIG. 1 shows the shape of a signal received from two targets to be located. The signal received from one target is denoted by 1 and the signal received from the other target is denoted by 2. The problem is that each of these signals 1 and 2 comprises several peaks one of which, the main peak 7, is the largest. Having detected the peaks, it is then possible to determine the time positions of the maximum values of the main peaks by comparing the time position of each main peak with a reference time. At each side of a main peak there are smaller peaks 8 called side peaks (corresponding to the side lobes of the aerial). Moreover, the amplitudes of the main peaks are different for different targets.

In the known method illustrated in FIG. 1, a main peak is detected using a constant reference level 3, called the cut-off level. This constant cut-off level 3 and the signal 1 are compared with each other and a resulting difference voltage is supplied to a trigger circuit which delivers a trigger pulse at the instant 4 when the signal 1 exceeds the cut-off level and at the instant 5 when the signal drops below the cut-off level. The first trigger pulse is taken as the beginning of the main peak 7 and the second trigger pulse as the end of the main peak. The time position of the peak 7 is, for example, then defined as the average value 6 of the time positions of the instants 4 and 5. This average value will indicate the time position of the center of the peak provided that the peak is symmetrical, which often is the case. When using this known method it is important not to set the cut-off level so low that it also intersects the side peaks, because these would then be erroneously recorded as separate bearings. If on the other hand, the cut-off level is set so high that the main peak does not cross it, no peaks at all will be detected. Consequently, there is a restricted region within which the cut-off level may be varied if a reliable time position or bearing is to be obtained. Moreover, a cut-off level which is too low for one signal may still be too high for another, as would be the case for signals 1 and 2 if the cut-off level in FIG. 1 were to be lowered to about 36 volts. Thus, the use of a constant cut-off level may lead to smaller signals being missed. With a method embodying the present invention, which involves the generation of a variable cut-off level which is automatically matched to the appearance of the input signal, it is possible to determine the existence (or the time position or bearing) of main peaks of different amplitudes in the same signal. Such a method is illustrated in FIG. 2 and can be performed either by way of an electronic device shown in FIG. 3 or by way of a computer.

Figure 2:
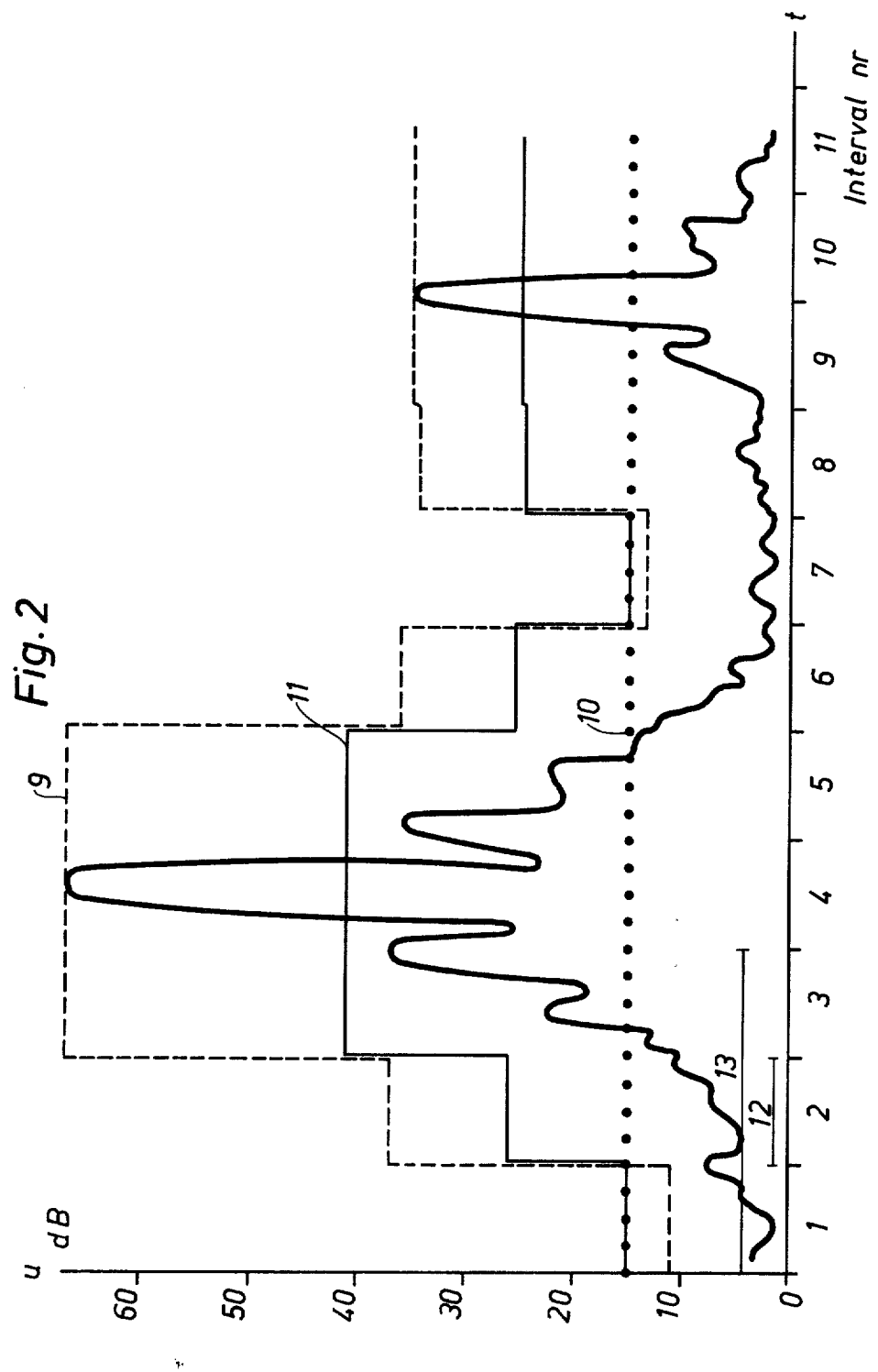
FIG. 2 is a diagram illustrating the performance of a method embodying the present invention.

As indicated in FIG. 2, the duration of the signal to be examined is divided into intervals which are denoted by the figures along the time axis. A number of successive intervals (three intervals in FIG. 2) forms a detection region. Each detection region is allocated to one of the intervals contained therein, conveniently the middle interval. Thus, the extent of interval No. 2 is denoted by reference numeral 12 and the extent of detection region No. 2 is indicated by numeral 13 in FIG. 2. Thus, a detection region is associated with each interval. The highest amplitude value of the signal within a detection region is detected (measured) and is also selected as the value of a respective section of a stepped maximum level function 9 which is composed of a plurality of such sections each corresponding to a respective detection region.

If the value of the maximum level function in any detection region is higher than a predetermined value 10 forming one of the lowest cut-off levels (reference level) a cut-off level function 11 is generated. This cut-off level function 11 has a smaller value than the maximum level function 9 in each detection region and is used to intersect the main peak. However, if the maximum level function for a detection region does not exceed the reference level the value of the reference level is assigned to said region. Generally speaking the difference between the maximum level function 9 and the cut-off level function 11 should be selected so that the cut-off level will cut or cross the main peaks but not the side panels of a signal. Said difference thus depends on the appearance of the input signal.

In FIG. 2 a difference of 50 percent is shown, so that the cut-off level 11 will lie exactly between maximum level 9 and reference level 10 in those intervals within which the maximum level function is higher than the reference level.

The value of the cut-off level is obtained half a detection region plus half an interval later than the start of that interval to which the associated detection region is allocated, thus making it impossible to apply the cut-off level directly to the input signals. Therefore, the signal to be examined, i.e. the input electrical signal, must be delayed by the corresponding time, i.e. half a detection region plus half an interval. This delay may for example be introduced by way of a shift register after an analogue-to-digital conversion of the signal.

The size of the intervals, the number of intervals in a detection region, the interval to which a detection region is allocated as well as the amount by which the maximum level function is reduced to form the cut-off level function may of course be varied and need not be the same as in the illustrated example. According to a preferred embodiment of the invention the number of intervals comprised in a detection region is odd, ($2k + 1$), where $k$ is an integer; $k$ may for example equal 9. If the middle one of these intervals has been assigned to the highest measured amplitude value within this detection region, the input electronic signal should be delayed by ($k + 1$) time intervals (half a detection region plus half an interval). The reduction (lowering) of the maximum level function may for example be related to other relative or absolute reference values than that shown and this reduction may also be selected in accordance with other rules; it may for example be expressed by way of a logarithmic function in which case higher values of the maximum level function are reduced in proportion more than smaller values.

Figure 3:
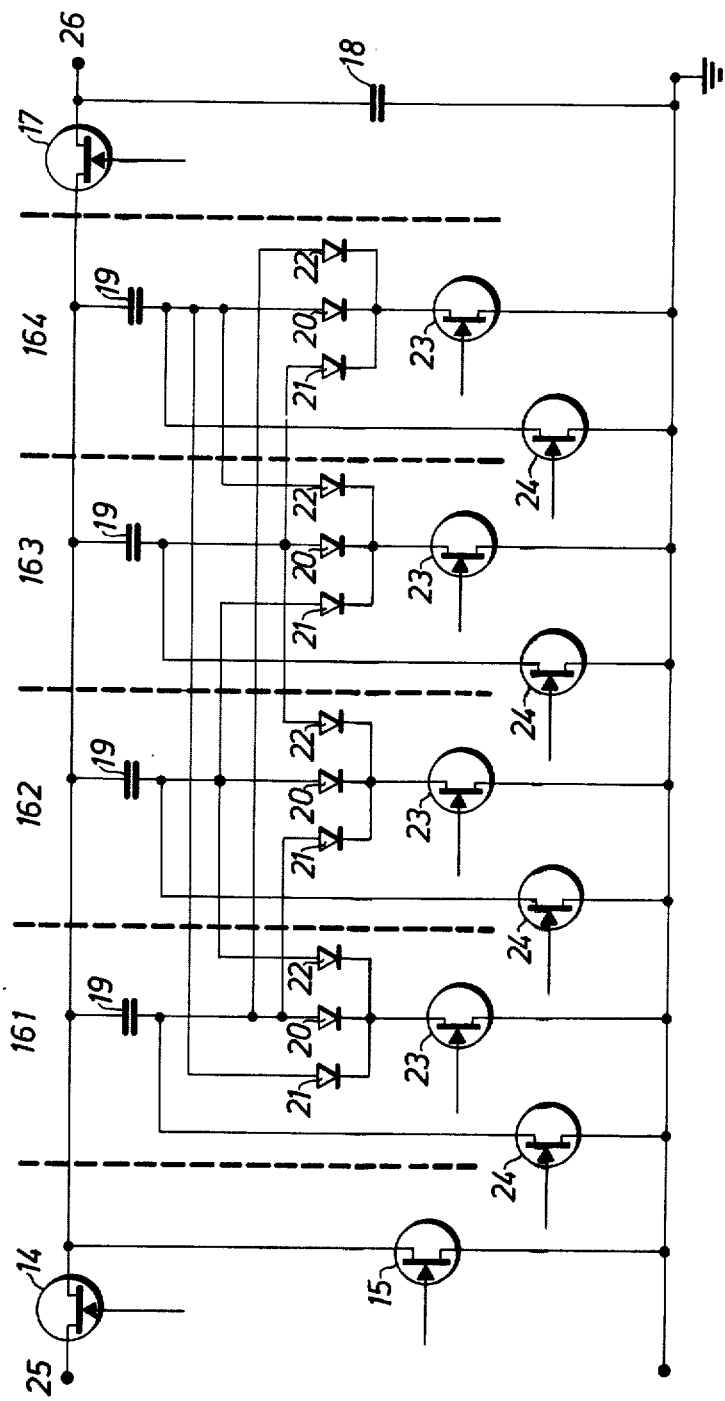
FIG. 3 is a circuit diagram of a device for generating a level function signal denoted by reference 9 in FIG. 2.

The stepped maximum level function 9 is generated by the electronic device shown in FIG. 3, which device operates with a detection region comprising three intervals, the detection region being allocated to the middle one of these three intervals. The signals obtained in taking a bearing are supplied to input terminal 25 of the device and the maximum level function is obtained at output terminal 26. The device may be divided into an input switch 14, a reset or erase switch 15, memory sections 161–164 and a sampling and memory circuit which comprises an output switch 17 and a memory capacitor 18. Each of the memory sections comprises a memory capacitor 19, three diodes 20, 21 and 22 of which one (20) is connected to the memory capacitor in its own memory section and the other two (21 and 22) are connected to adjacent memory sections respectively. The cathodes of the diodes are connected to a common junction to which one terminal of a write switch 23 is also connected. One terminal of a read switch 24 is connected to the junction between diode 20 and one plate of memory capacitor 19. The other terminals of the read and write switches are connected to ground and the other plate of the memory capacitor is connected to a bus bar. The bus bar is connected to input terminal 25 via input switch 14, to ground via reset switch 15, and to output terminal 26 via output switch 17. Speaking in terms of time, an interval is divided into a writing operation lasting for almost the whole of the interval, a reading and an erasing operation; two last mentioned operations lasting for about equal times and occupying only a small fraction of the interval.

The switches are so gated that they are conducting during the operations described below and non-conducting during the rest of the time. During a writing operation input switch 14 and one write switch 23 are conducting. During a reading operation output switch 17 and one read switch 24 are conducting. During an erasing operation reset switch 15 and one read switch 24 are conducting. Write switches 23 are turned on sequentially in an order corresponding to the order of the memory sections, viz. 161, 162, 163, 164, 161, 162, 163 . . . and in the order of the intervals, viz. 1, 2, 3, 4, 5, 6, 7 . . . compare FIG. 2. During the duration of a detection region, i.e. during three consecutive intervals, the signal voltage delivered at input terminal 25 is supplied to each memory capacitor 19 which lies in series with any of the diodes 20 to 22 and in series with those write switches 23 which are conducting during the respective intervals. Each such capacitor will thus be charged to a voltage corresponding to the maximum voltage of the signal voltage.

After the writing operation, which in this embodiment lasts for the duration of a detection region and during which time a memory capacitor 19 has been in operation, the reading operation starts and during this operation the voltage value to which said memory capacitor 19 has been charged is transferred to memory capacitor 18. Thereafter, the voltage value to which capacitor 19 has been charged is erased by discharging said memory capacitor 19 through read switch 24 and reset switch 15.

To illustrate the operation of the level memory the signal for detection region 2, i.e. region 13 in FIG. 2, may be considered. During this detection region memory capacitor 19 in section 162 will be charged via diode 22 and write switch 23 in section 161 to about 8 volts (FIG. 2) during interval No. 1. At the beginning of interval No. 2 write switch 23 in section 162 is rendered conducting. During interval No. 2 capacitor 19 in section 162 will not begin to charge until the input signal voltage exceeds about 8 volts, which occurs at the end of interval No. 2 when the capacitor will be charged to about 10 volt. At the end of interval No. 2 write switch 23 in section 162 becomes non-conductive and write switch 23 in section 163 is rendered conducting. As a result, the capacitor 19 in section 162 will be charged to about 38 volts via diode 21 in section 163. At the end of interval No. 3 input switch 14 becomes non-conductive and the read operation begins, the read switch 24 in section 162 and the output switch 17 being rendered conductive simultaneously thereby transferring the voltage on capacitor 19 in section 162 to memory capacitor 18 and thus to output terminal 26. The information held on capacitor 19 in section 162 is then erased in the described manner. Finally, it should be pointed out that during interval No. 2, during which time write switch 23 in section 162 is conducting, memory capacitors 19 in sections 161 and 163 are charged via diodes 21 and 22 in section 162.

A synchronising unit (not shown) controls the turning off and on of switches 14, 15, 17, 23 and 24, and the level memory shown in FIG. 3 is supplied with appropriate voltages from a voltage source (not shown). The above described sequence is cyclically repeated in sections 163, 164, 161 etc. and in this way the maximum level function is obtained at output terminal 26 with a time delay amounting to half a detection region plus half an interval.

The following rule is observed when the width of an interval is selected: the time intervals should not be too long because there is then a risk that smaller main peaks in the signal will not be intersected by the cut-off level. On the other hand, the intervals should not be too small because there is then a risk that side peaks may be detected as main peaks when the maximum level function is lowered or reduced and thus the result will be a faulty bearing recording.

The following rule is observed when the width of the detection region is selected; the width should not be too great because there is then a risk that no variable cut-off level matched to the appearance of the signal will be obtained. If the width is too great the cut-off level may be constant which is not desired.

It is also noted that, when selecting the interval to which a detection region is allocated, the time delay must not be too long because the bearing reading will then be obtained too late. Normally, it is desired to obtain the bearing reading of the target as soon as possible.

A block diagram of a preferred embodiment of the apparatus according to the present invention is shown in FIG. 4. In this apparatus, the electrical signals to be examined are supplied to a level memory 27 of the kind indicated in FIG. 3 and to an analogue-to-digital converter 28 where the signals are digitalised. These digitalised signals are delayed in a delay circuit 29 for a time equal to the time required to generate the maximum level function in level memory 27. The delayed signals are converted back into analogue form by a digital-to-analogue converter 30 before they are supplied to one input of a comparator 31. The maximum level function from level memory 27 is supplied to a level reducing circuit 32 where the level is reduced down to a cut-off level. The cut-off level function generated in level reducing circuit 32 is supplied to a second input of the comparator. If the amplitude of the reconstituted analogue signals exceeds the cut-off level, the comparator will deliver a signal indicating the beginning and the end of a main peak in the input electrical signal. The signals delivered at the output terminal of the comparator 31 are used to determine the time position and thus also the bearing of a detected main peak by way of known circuits (not shown). Level memory 27, analogue-to-digital converter 28 and delay circuit 29 are all controlled by synchronizing and controlling circuits 33 which inter alia also execute the various switching operations of switches 14, 23, 24, 15 and 17 in the level memory.

If a computer is used instead of the FIG. 4 apparatus it is also possible to modify the method by which the maximum level function is generated in various ways. If a computer is used it is possible to carry out a continuous measurement of the maximum amplitude of the electrical signal under examination in each interval (in contrast to a corresponding measurement over a whole detection region). The maximum amplitude values of each interval are then stored in the memory of the computer. The amplitude values, for example the amplitude values of three successive intervals, are then analysed in accordance with a program and this program then selects the highest amplitude value among these three intervals and this highest amplitude value is assigned or allocated to the middle one of these three intervals. Thereafter, the maximum level function is continuously generated and reduced to a suitable cut-off level function. The input electrical signals are delayed by the same time required to generate the maximum level function before they are compared with the cut-off level function. The program or the rule according to which the measured and stored highest amplitude values (within an interval or within a detection region) are analysed may of course be varied in accordance with known methods used in the field of statistical analysis, for example by way of average value methods, weighting methods, the least square method etc. In certain cases the use of such a method may imply that the maximum level function need not be generated first and thereafter be reduced, but that a suitable cut-off level function is directly obtained.

Although the invention has been described in connection with taking of bearings the method and the device according to the invention may be used for other purposes, for example echo sounding etc.

I claim:

1. In a method of determining the existence and the time position of main peaks appearing in an electrical signal by comparing the amplitude of said signal with a variable reference level, called the cut-off level, an improved method for processing such signal, comprising:

dividing the signal to be examined into consecutive time intervals;

allocating a cut-off level to each of said time intervals, the amplitude of said cut-off level being based upon an analysis of measurements performed on the amplitude of the signal in the corresponding interval and in a number of adjacent intervals;

generating allocated cut-off levels during each consecutive time interval thereby providing a variable cut-off level function for the electrical signal;

delaying said electrical signal for a time equal to the time required to generate said cut-off level function; and comparing the amplitude of the delayed signals with the cut-off level function to detect the presence, in the signal, of a main peak whose time position can then be determined.

2. A method as claimed in claim 1, in which the cut-off level allocated to an interval is provided by: measuring and determining the maximum amplitude value appearing in a number of successive intervals; allocating said maximum value to one of said successive intervals; and reducing said maximum value by an amount having a predetermined relationship to said maximum value.

3. A method as claimed in claim 2, in which: said number of successive intervals is ($2K + 1$), where $K$ is a positive integer; and said measured maximum value is allocated to the middle one of said successive intervals.

4. Apparatus for determining the existence and the time position of main peaks appearing in an electrical signal by comparing the amplitude of said signal with a variable reference level, called the cut-off level, which apparatus comprises:

a level memory connected to receive said electrical signal and operative to divide the signal into consecutive time intervals and to deliver for each interval an output signal indicating the maximum amplitude of said signal during a number of successive intervals in which the interval corresponding to the output signal occurs;

a level lowering circuit connected in series with said level memory and operative to lower the output amplitude signal supplied by said memory by a predetermined amount relative to a preselected lower reference level, thereby to generate a cut-off level function signal for each consecutive interval composed of said lowered signal amplitude signal;

a delay circuit connected to receive said electrical signal and operative to delay said signal for a time equal to the time required to generate said cut-off level function signal;

a comparison circuit connected to receive said delayed electrical signal and said cut-off level function signal and operative to deliver an output signal indicating the presence of a main peak in the said electrical signal when the amplitude of said delayed electrical signal exceeds the amplitude of said cut-off level function signal; and synchronising circuit arranged to control the operation of said level memory and said delay circuit.

5. Apparatus as claimed in claim 4, in which said level memory comprises a plurality of memory sections, each of which includes:

a bus bar which is common to all memory sections;

a capacitor having one plate connected to the bus bar;

a first diode having its anode connected to the other plate of the capacitor;

a write switch connected between the cathode of said first diode and ground;

second and third diodes, the cathodes of said second and third diodes being connected to the junction of the cathode of said first diode and said write switch, the anode of said second diode being connected to the junction of the capacitor and the first diode of the preceding memory section, the anode of said third diode being connected to the junction of the capacitor and the first diode of the following memory section; and a read switch connected between ground and the junction of the capacitor and said first diode.

6. Apparatus as claimed in claim 5 in which said level memory includes an input switch and a reset switch, said input switch having an input terminal to which said electrical signal is supplied and an output terminal connected to one end of said bus bar and to one terminal of said reset switch whose other terminal is grounded, said reset switch thus being connected in parallel with said memory sections.

7. A device as claimed in claim 6, in which said level memory includes a sampling and memory circuit connected in parallel with said memory sections, said sampling and memory circuit having an output switch an input terminal of which is connected to the other end of said bus bar and the output terminal of which is connected via a capacitor to ground and to the input terminal of said level lowering circuit.

* * * * *